US008973932B2

(12) United States Patent
Pielock

(10) Patent No.: US 8,973,932 B2
(45) Date of Patent: Mar. 10, 2015

(54) AIR SPRING COVER WITH SWITCH-BASED AIR VOLUME

(71) Applicant: Continental Teves AG & Co., oHG, Frankfurt (DE)

(72) Inventor: Ralf Pielock, Essel (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/349,845

(22) PCT Filed: Oct. 2, 2012

(86) PCT No.: PCT/EP2012/069491
§ 371 (c)(1),
(2) Date: Apr. 4, 2014

(87) PCT Pub. No.: WO2013/050385
PCT Pub. Date: Apr. 11, 2013

(65) Prior Publication Data
US 2014/0252743 A1  Sep. 11, 2014

(30) Foreign Application Priority Data

Oct. 6, 2011 (DE) .......................... 10 2011 084 101
Jan. 12, 2012 (DE) .......................... 10 2012 200 388

(51) Int. Cl.
*F16F 9/04* (2006.01)
*B60G 17/052* (2006.01)
(Continued)

(52) U.S. Cl.
CPC ............ *B60G 17/0521* (2013.01); *F16F 9/055* (2013.01); *B60G 11/27* (2013.01); *B60G 17/0485* (2013.01); *F16F 9/0463* (2013.01); *F16F 9/049* (2013.01); *F16F 9/05* (2013.01)
USPC .................................................. 280/124.157

(58) Field of Classification Search
CPC ...... B60G 17/0485; F16F 9/0463; F16F 9/055
USPC ................................................. 280/124.157
See application file for complete search history.

(56) References Cited

U.S. PATENT DOCUMENTS 4,325,541 A * 4/1982 Korosladanyi et al. ....... 267/220
4,398,704 A * 8/1983 Buchanan et al. .......... 267/64.21
(Continued)

FOREIGN PATENT DOCUMENTS

DE      102 36 621      3/2004
DE       10311263 B3 *  7/2004      ................ F16F 9/05
(Continued)

OTHER PUBLICATIONS

International Search Report corresponding to application No. PCT/EP2012/069491, dated Jan. 23, 2013.

*Primary Examiner* — Nicole Verley
(74) *Attorney, Agent, or Firm* — RatnerPrestia

(57) ABSTRACT

An air spring for vehicle undercarriages, including an air spring cover and rolling piston. The air spring cover and rolling piston are connected by an air spring bellows. The air spring cover accommodates a first and second clamping ring for clamping the air spring bellows to fix the air spring bellows to the air spring cover. The rolling piston and air spring bellows have a common first air volume. The end of the rolling piston closest to the undercarriage accommodates a third clamping ring to seal the first air volume from the external environment. The air spring cover has a second air volume. The first air volume and the second air volume are sealed off from the external environment. The first air volume is spatially separated from the second air volume. A switch valve enables a first air path to link the second air volume to the first air volume.

15 Claims, 2 Drawing Sheets

Figure 1:
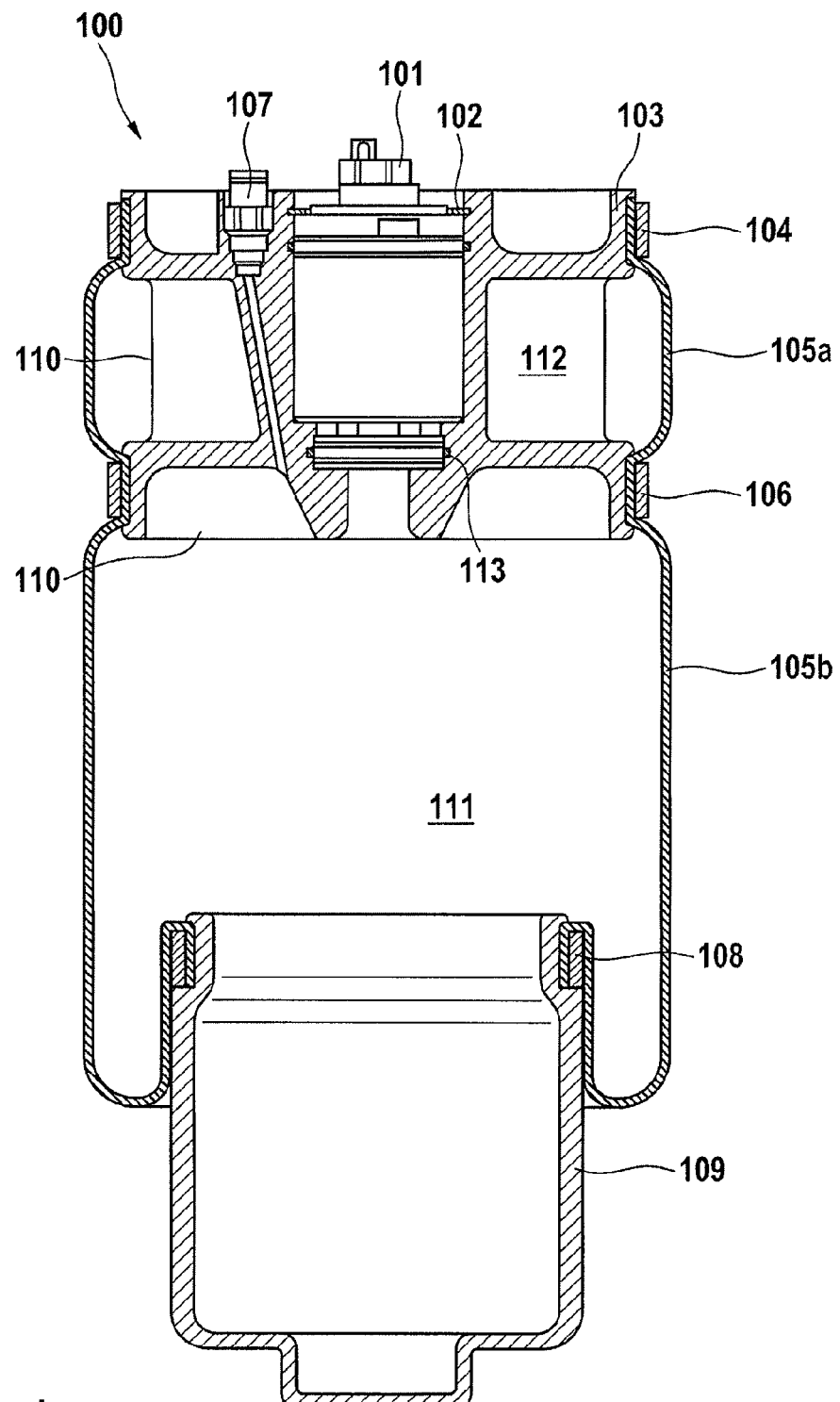

(51) Int. Cl.
   *F16F 9/05*       (2006.01)
   *B60G 11/27*      (2006.01)
   *B60G 17/048*     (2006.01)

(56) References Cited

U.S. PATENT DOCUMENTS

| | | | | |
|---|---|---|---|---|
| 4,474,267 | A * | 10/1984 | Empson | 188/33 |
| 5,413,316 | A | 5/1995 | Easter | |
| 5,859,692 | A * | 1/1999 | Ross et al. | 356/4.01 |
| 6,457,702 | B1 * | 10/2002 | Oishi | 267/122 |
| 6,561,500 | B2 * | 5/2003 | Schisler et al. | 267/64.27 |
| 6,651,995 | B1 * | 11/2003 | Buttner | 280/124.157 |
| 6,698,730 | B2 * | 3/2004 | Easter | 267/64.28 |
| 6,824,143 | B2 * | 11/2004 | Choi | 280/5.514 |
| 7,213,799 | B2 * | 5/2007 | Behmenburg et al. | 267/64.24 |
| 7,328,887 | B2 * | 2/2008 | Leonard | 267/122 |
| 7,802,776 | B2 * | 9/2010 | Behmenburg et al. | 267/64.24 |
| 7,806,391 | B2 * | 10/2010 | Leonard | 267/122 |
| 7,959,138 | B2 * | 6/2011 | Leonard | 267/64.27 |
| 8,215,620 | B2 * | 7/2012 | Krauss | 267/64.17 |
| 8,534,687 | B2 * | 9/2013 | Coombs et al. | 280/124.16 |
| 8,585,025 | B2 * | 11/2013 | Lee | 267/64.27 |
| 8,800,975 | B2 * | 8/2014 | Moulik et al. | 267/64.24 |
| 2003/0173723 | A1 | 9/2003 | Behmenburg et al. | |
| 2006/0207846 | A1 * | 9/2006 | Krauss | 188/314 |
| 2008/0223671 | A1 * | 9/2008 | Gleu | 188/298 |
| 2009/0200718 | A1 * | 8/2009 | Roemer et al. | 267/123 |
| 2011/0115140 | A1 * | 5/2011 | Moulik et al. | 267/64.23 |

FOREIGN PATENT DOCUMENTS

| | | |
|---|---|---|
| DE | 10 2005 054370 | 5/2007 |
| DE | 10 2006 033198 | 1/2008 |
| DE | 102006052627 B4 * | 10/2009 |
| EP | 1 344 957 | 9/2003 |
| EP | 2 246 206 | 11/2010 |
| JP | 11-303919 | 11/1999 |
| WO | WO 2008089141 A1 * | 7/2008 |

* cited by examiner

AIR SPRING COVER WITH SWITCH-BASED AIR VOLUME

CROSS REFERENCE TO RELATED APPLICATION

This application is the U.S. National Phase Application of PCT International Application No. PCT/EP2012/069491, filed Oct. 2, 2012, which claims priority to German Patent Application No. DE 10 2011 084 101.6, filed Oct. 6, 2011, and DE 10 2012 200 388.6, filed Jan. 12, 2012, the contents of such applications being incorporated by reference herein.

FIELD OF THE INVENTION

The invention relates to an air spring cover of an air spring of a motor vehicle.

BACKGROUND OF THE INVENTION

Freestanding air springs consist of a rolling piston and an air spring cover, which are connected to one another by an air spring bellows, wherein the air spring bellows is fixed by means of clamping rings on the air spring cover in a body-side clamping region and on the rolling piston in a running gear-side clamping region. In this case, the air spring generally has just one single air volume.

Air spring covers that already exist in the prior art, having an integrated switching valve which, in one operating state of the switching valve, enable a second air volume present in the air spring cover to be linked in, are of highly complex construction, using a large number of component parts, and have a correspondingly complex production method, resulting in many cases in an excessive weight of the air spring cover owing to the predominant use of metal materials. Document DE 10 2006 033 198 A, which is incorporated by reference, represents the prior art as regards air springs with a two-part air spring cover.

SUMMARY OF THE INVENTION

Given this situation, an aspect of the invention provides an improved air spring cover.

This is achieved by independent patent claim.

An air spring for vehicle running gear, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the air spring cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

This can have the advantage that a greater spread of the air spring stiffness can be achieved by means of the switchable additional volume. By virtue of the fact that the second air volume situated in the interior of the air spring cover is sealed off from an external environment by the positively engaging clamping rings on the body-side cover rim and on the rolling piston-side cover rim, the additional installation space available within the air spring cover can be used as an additional second air volume for changing the spring characteristic of the pneumatic spring. The function of the pneumatic spring is normally performed by the first air volume enclosed by the rolling piston and the air spring bellows. Embodiments of the invention bring about the linking of the additional second air volume to the first air volume through the airtight installation of a switching valve in the air spring cover. Through control of the operating states of the switching valve, the spring characteristic, in particular spring stiffness, of the pneumatic spring can be spread even wider and, at the same time, controlled with greater sensitivity.

At the same time, the construction of the air spring cover would be simplified. The fact that the air spring bellows is not, as otherwise customary, taken only as far as the lower rim of the air spring cover but even further in the direction of the body, as far as the upper rim of the air spring cover, renders the otherwise customary component parts of the air spring cover superfluous. The weight of the air spring cover is thereby considerably reduced in an advantageous manner. A compact construction of the air spring cover is rendered superfluous by the embodiment described. An additional space, which is not used up by component parts of the air spring cover but can be used in other ways, is formed in the internal region of the air spring cover.

The use of the same air spring bellows to seal off the first and the second air volume implies that no additional component elements might be required for sealing with respect to an external environment. Further material is saved and the production process is simplified even further. No additional operations are required for welding or adhesive bonding. The number of production processes and hence production costs are reduced.

According to one embodiment of the invention, the switching valve is furthermore designed to receive, on the outer wall thereof, a first and a second O-ring, wherein the first O-ring is designed to seal off the second air volume from an external environment, wherein the second O-ring is designed to delimit the second air volume with respect to the first air volume.

This can have the advantage that two separate air volumes within the air spring can be separated completely from one another and from an external environment. By linking in the second air volume within the air cover, the second air volume can be included in the operation of the pneumatic spring. The spring characteristic of the air spring can be adapted to a great extent to the requirements in respect of vehicle operation and the state of the loading of the vehicle.

According to one embodiment of the invention, the air spring cover is designed to allow a second air path between the first air volume and the external environment while bypassing the second air volume and while bypassing the switching valve.

This can have the advantage that any reduced or excess air pressure prevailing in the first air volume can be compensated directly by a process of exchange with air from the external environment while bypassing the second air volume and while bypassing the switching valve. If the air humidity of the incoming air were very high, for example, the switching valve in the air spring cover or other metal parts in the air spring cover could initially be largely protected from moisture from the incoming air. Possible corrosion of the switching valve and metal parts in the air spring cover would be prevented in an effective manner by bypassing the second air volume during the filling of the second air volume with ambient air. In the form, for example, of a standard air connection which, while being separated airtightly from the second volume, passes through the air spring cover from an exterior of the air spring cover as far as the bottom edge of the cover in the direction of the first air volume, embodiments of the invention could allow a direct exchange of air from the first air volume with ambient air.

According to one embodiment of the invention, the switching valve is furthermore designed to allow a third air path between the first air volume and the external environment.

This can have the advantage that an exchange of air from the external environment and the system air from the first air volume could be controlled in an automated way and in a manner defined by a particular operating state of the switching valve. Self-regulation of the pressure in the first air volume would thus be possible.

According to one embodiment of the invention, the air spring cover has at least one component part, wherein the at least one component part of the air spring cover is an injection molded plastic part and/or a metal part.

This can have the advantage that the simple construction of the air spring cover, in which the outer rim is formed primarily by the part of the air spring bellows which is extended in the direction of the body, allows a stabilizing support framework that may be required, depending on the available installation space, in the form of an injection molded plastic part of any desired shape or of a metal part cast in any desired form. Embodiments of the invention thus exhibit free configuration of the air spring cover and hence a broad range of applications in many types of vehicle. Thus, for example, an air spring cover could have an internal supporting framework in the form of radially arranged ribs in order, on the one hand, to give the air spring cover a structure and, on the other hand, to make available a further cavity for a second air volume, which could be linked to the pneumatic actuator system. Such a system, e.g. a rib system, in the air spring cover would also allow stable fixing of the switching valve in the air spring cover.

If embodiments of the invention were to consist only of an injection molded plastic part, for example, it would be possible to make the production process considerably easier and quicker. If the internal framework of the air spring cover were to consist completely of plastic, for example, there would be a significant weight saving in comparison with a compact construction of the air spring cover made from metal component parts. It would thus be considerably easier to comply with weight requirements on the air spring cover.

According to one embodiment of the invention, the first clamping ring and the second clamping ring are of identical or different configuration in respect of the diameter and/or height thereof.

This can have the advantage that, in the case where the diameter and height of the first and of the second clamping ring are identical, the production process is considerably simplified. It would be possible, for example, to use the same clamping jaws for securing the air spring bellows on the air spring cover during assembly. This could even take place directly in succession on the same clamping machine.

In the case where the diameter and the height of the first and second clamping ring are different, maximum adaptation of the shape of the air spring cover to the available installation space in the vehicle could be enabled.

According to one embodiment of the invention, the air spring cover and the rolling piston are connected to one another by a bayonet joint, by screwing, by adhesive bonding and/or by clamping.

This can have the advantage that a suitable method of connecting the air spring cover to the lower part of the air spring can be chosen, depending on the available installation space. If, for example, there were less installation space available in the vehicle for installing an air spring, an internal and external bayonet joint, for example, would be a suitable connection method for ensuring axial cohesion. A bayonet joint would also allow any separation of the air spring cover from the lower part of the air spring that might subsequently be necessary, something that would not be allowed by welding. If there were more installation space available, a further clamp-action joint would be expedient, for example. The appropriate type of joint could be chosen depending on the available installation space in the vehicle and depending on operating and structural requirements on the air spring.

According to one embodiment of the invention, the air spring cover has at least two component parts, wherein the component parts are welded securely to one another.

This can have the advantage that the air spring cover could have a number of component parts with different functions, for example, and the component parts would be fixed securely in their position relative to one another by welding. At the same time, compartments that were sealed off airtightly from one another for air chambers would be created. In particular, the second air volume would be sealed off airtightly from the first air volume and from the external environment. Welding of the individual component parts would create positive and, at the same time, airtight joints between the individual parts. Further sealing using further component elements, which would give rise to additional weight, would no longer be necessary.

According to one embodiment of the invention, the air spring bellows has at least one layer of fabric strength members, wherein the fabric strength members have fiber reinforcements, wherein a preferential axis of the fiber reinforcements extends parallel, perpendicularly or obliquely to a longitudinal axis of the air spring.

This can have the advantage that the air spring bellows, which, with its part facing the body, forms the outer rim of the air spring cover, could satisfy various requirements relating to compensation of forces acting transversely to the longitudinal axis of the air spring through selection of a suitable embodiment of the air spring bellows. To compensate torsional movements and/or cardanic movements, a bellows with fiber reinforcements in one or more layers, referred to as "axial layers", aligned parallel to the longitudinal axis of the air spring would be suitable as an embodiment. If, on the other hand, the emphasis were on the requirements of comfort in respect of the springing of the body, an embodiment of the air spring bellows with crossed layers would be suitable, in which preferential directions of the fiber reinforcements extended obliquely to the longitudinal axis of the air spring and in which the preferential directions of the fiber reinforcements cross over one another in the manner of a net. In an embodiment of the air spring bellows with fiber reinforcements aligned in one or more layers perpendicularly to the longitudinal axis of the air spring, referred to as a "90° winding system", on the other hand, a sensitive stress and strain behavior of the air spring could be central considerations.

Embodiments of the inventions would also allow embodiment of the air spring bellows as a hybrid bellows, in which it would be possible to implement an embodiment of the air spring bellows as a cross-layer system in the region on the rolling-piston side and to implement an embodiment as an axial layer system in the region on the body side. In the case of a hybrid bellows of this kind, which is possible here, mutually exclusive preferences in terms of the emphasis on compensating torsional and cardanic movements or on maximum satisfaction of comfort requirements as regards the springing of the body can usually both be combined in an advantageous manner.

According to one embodiment of the invention, the first and the second clamping region are reinforced radially by ribs.

This can have the advantage that the first and the second clamping ring can be pressed firmly against a fixed framework part of the air spring cover to secure the air spring bellows on the air spring cover, and these two joints thus remain stable and airtight. While the majority of the outer rim of the air spring cover consists substantially of part of the elastic and pliable air spring bellows with a low elastic modulus, the first and the second clamping region with the ribs made of plastic or metal as reinforcing elements have a high elastic modulus. A secure clamping action between the air spring cover and the air spring bellows and airtight sealing of the second volume with respect to the first air volume and with respect to the external environment thus remain assured.

According to one embodiment of the invention, the second air path is situated between the first air volume and the external environment, within one rib of the ribs.

This can have the advantage that an air supply from an external environment to the first air volume is protected within a rigid rib made of plastic or metal. The air supply has no contact with the second air volume within the air spring cover. If the air supply does start to leak, no air can flow from the external environment into the second air volume via this air supply because the encasing of the air supply by the rib would prevent this.

According to one embodiment of the invention, shapes of the air spring cover, of the rolling piston and/or of the air spring bellows can be matched to an installation region in a vehicle.

This can have the advantage that the greatest possible adaptability of the structural shape of the air spring together with the air spring cover to a specified installation region in the vehicle could be ensured. Suitable shaping of the air spring cover, of the rolling piston and/or of the air spring bellows could allow an air spring to be installed in a vehicle by means of simple retaining lugs, for example. All types of vehicle may therefore be considered as the area of application.

According to one embodiment of the invention, the air spring bellows is formed into a fold between the first clamping ring and the second clamping ring.

This can have the advantage that the first clamping ring in the first clamping region would be relieved of static load through the formation of a fold in the air spring bellows between the first and the second clamping region. This first clamping ring, which not only fixes the air spring bellows on the body-side part of the air spring cover but also seals off the second air volume from the external environment, could be of smaller configuration in its embodiment by virtue of static load relief by the rolling fold. This entails not only a saving of materials and a reduction in the weight of the air spring cover but also greater flexibility in the shaping of the air spring cover.

In another aspect, the invention relates to a motor vehicle running gear having at least one air spring, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

In another aspect, the invention relates to a motor vehicle having a body and running gear having at least one air spring, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

BRIEF DESCRIPTIONS OF THE DRAWINGS

Figure 2:
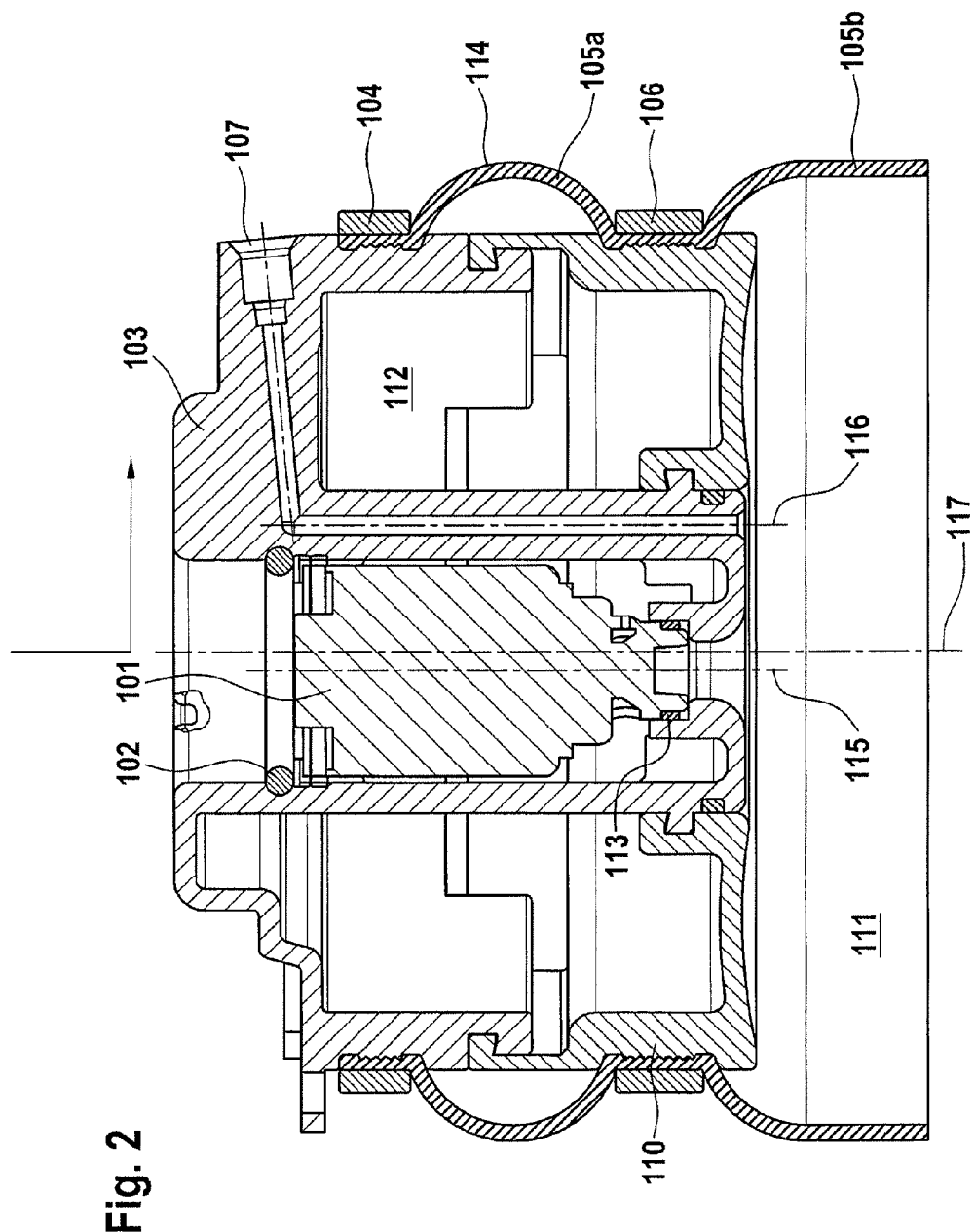

Preferred embodiments of the invention are explaining greater detail below with reference to the following drawings, in which:

FIG. 1: shows an air spring having an air spring cover in longitudinal section,

FIG. 2: shows an air spring cover in longitudinal section.

DETAILED DESCRIPTION OF THE PREFERRED EMBODIMENTS

In the text which follows, elements that are similar to one another are denoted by the same reference signs.

FIG. 1 shows an air spring 100 having an air spring cover 103 in longitudinal section. The air spring cover 103 is connected to the rolling piston 109 by an air spring bellows 105a, 105b. The air spring bellows 105a is secured on the body-side rim of the air spring cover 103 in a first clamping region by means of a first clamping ring 104. In the transitional region from the air spring cover 103 to the rolling piston 109, the air spring bellows 105a is secured in a second clamping region by means of a second clamping ring 106. The air spring bellows 105b is furthermore secured directly on the rolling piston 109 in a third clamping region by means of a third clamping ring 108.

The rolling piston 109 and part of the air spring bellows 105b surround a first air volume 111. By virtue of the fact that the air spring bellows 105a is taken not as far as the lower rim of the air spring bellows 103, as is usual, but as far as the upper, body-side rim of the air spring cover 103, an outer wall of the air spring cover 103 is formed by the air spring bellows 105a. By virtue of the fact that the first clamping ring 104 rests positively and airtightly on the upper, body-side rim of the air spring cover 103 and by virtue of the fact that the second ring 106 rests positively and airtightly on the air spring cover in the region of the second clamping region, a second air volume, which is closed off airtightly from an external environment and from the first air volume, is formed in the interior region of the air spring cover 103.

Embodiments of the invention thus have an air spring cover 103 which, in comparison with otherwise customary compact designs, have a cavity which could, in an airtight manner, make available a second air volume for the operation and functioning of the air spring. To link in this second volume, the air spring cover 103 furthermore has a switching valve 101, which enables a first air path 115 between the first and the second air volume in one operating state. By linking the second air volume 112 to the first air volume 111, the spring characteristic of the air spring 100 can be modified in such a way as to enable the stiffness of the air spring to be spread over a wider range.

The fact that the first clamping ring 104 and the second clamping ring 106 fix the air spring bellows 105 positively on the air spring cover 103 results in airtight sealing with respect to an external environment. Additional component parts for sealing are thus eliminated.

In this embodiment, the air spring cover in FIG. 1 has radially aligned ribs 110 in the interior thereof. These serve as a framework for imparting shape to the air spring cover 103 and for stabilizing it. The first and the second clamping region for clamping the first clamping ring 104 and the second clamping ring 106 thus acquire stability and ensure a stable, positive joining method which simultaneously has sealing functionality. The switching valve 101 is embedded in the center of the framework formed at the ribs. For sealing with respect to an external environment, a first O-ring 102 is mounted on the outer wall of the switching valve 101 on the body side. For sealing off the second air volume 112 from the first air volume 111, a second O-ring 113 is mounted on the outer wall of the switching valve 101 on the rolling-piston side.

Within a rib 110, the air spring cover 103 has a standard air connection 107. The standard air connection 107 enables a second air path 116 between the external environment and the first air volume 111. By virtue of the fact that the standard air connection 107 is embedded within a rib 110, it is once again ensured that air exchange between the external environment and the first air volume 111 is enabled while bypassing the second air volume 112.

FIG. 2 shows the air spring cover 103 with an integrated switching valve 101 in longitudinal section. The first air path 115 between the first air volume 111 and the second air volume 112 is indicated in dashed lines. This is enabled in a defined operating state of the switching valve 101.

The switching valve 101 furthermore enables a third path 117 between the external environment and the first air volume 111 in another operating state.

The standard air connection 107 enables a second air path 116 between the external environment and the first air volume 111.

In the embodiment of the invention illustrated in FIG. 2, the air spring bellows 105a has a bellows fold 114 in the region of the air spring cover 103. The first clamping ring 104 is relieved of static load by the bellows fold 114. Embodiments of the invention in the form illustrated in FIG. 2 thus make it possible for the first clamping ring 104 to be made smaller in terms of diameter and height than the second clamping ring 106. As a result, not only is material saved and the weight of the air spring cover reduced but additional possibilities for the shaping of the air spring cover 103 are thereby obtained.

The use of a thin air spring bellows in combination with an external drive is not shown. In this embodiment, it would be necessary for the upper region of the air spring bellows 105a to be thickened and reinforced by "folding over", thus making pressure resistance possible without an external guide. As is visible in FIG. 1 and FIG. 2, the air spring cover 103 can have different component elements in the internal region. This can be a single component part or a plurality of component parts. These component parts can consist of just one single plastic injection molding, for example, or, alternatively, of a casting made from a metal, e.g. aluminum or steel. Flexible shaping of the air spring cover 103 while saving material is thereby ensured in an advantageous manner. The shape of the air spring cover can thus be adapted to an available installation space in the vehicle. By sacrificing a compact construction, the weight of the air spring cover 103 is significantly reduced, making it easier to comply with stipulated weight requirements.

Embodiments of the invention disclose an air spring cover 103 of an air spring 100, which cover, by sacrificing a compact construction and using the air spring bellows 105a as an external wall of the air spring cover 103, provides an improved air spring 100, the spring stiffness of which can be spread over a wider range and can be varied to a greater extent by self-regulated linking in of a second air volume 112 according to requirements. The construction of the air spring cover described is distinguished by low complexity. It is possible to dispense with additional component elements for sealing of the first air volume 111 and the second air volume 112 since the first clamping ring 104 and the second clamping ring 106 together with the air spring bellows 105a rest positively and airtightly against a stable internal framework of the air spring cover 103. The number of production processes is thus significantly reduced. Less material is required to produce the air spring cover 103. As a result, there is simultaneously a significant reduction in the weight of the air spring cover 103. The possibility of arbitrary shaping of the air spring cover enables such an air spring to be used in vehicle types of the most diverse kind.

LIST OF REFERENCE SIGNS 100 air spring
101 switching valve
102 first O-ring
103 air spring cover
104 first clamping ring
105a, 105b air spring bellows
106 second clamping ring
107 standard air connection
108 third clamping ring
109 rolling piston
110 ribs
111 first air volume
112 second air volume
113 second O-ring
114 bellows fold
115 first air path
116 second air path
117 third air path

The invention claimed is:

1. An air spring for vehicle running gear, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the air spring cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

2. The air spring as claimed in claim 1, wherein the switching valve is furthermore designed to receive, on the outer wall thereof, a first and a second O-ring, wherein the first O-ring is designed to seal off the second air volume from an external environment, wherein the second O-ring is designed to delimit the second air volume with respect to the first air volume.

3. The air spring as claimed in claim 1, wherein the air spring cover is designed to allow a second air path between the first air volume and the external environment while bypassing the second air volume and while bypassing the switching valve.

4. The air spring as claimed in claim 1, wherein the switching valve is furthermore designed to allow a third air path between the first air volume and the external environment.

5. The air spring as claimed in claim 1, wherein the air spring cover has at least one component part, wherein the at least one component part of the air spring cover is an injection molded plastic part and/or a metal part.

6. The air spring as claimed in claim 1, wherein the first clamping ring and the second clamping ring are of identical or different configuration in respect of the diameter and/or height thereof.

7. The air spring as claimed in claim 1, wherein the air spring cover and the rolling piston are connected to one another by at least one of a bayonet joint, by screwing, by adhesive bonding and by clamping.

8. The air spring as claimed in claim 1, wherein the air spring cover has at least two component parts, wherein the component parts are welded securely to one another.

9. The air spring as claimed in claim 1, wherein the air spring bellows has at least one layer of fabric strength members, wherein the fabric strength members have fiber reinforcements, wherein a preferential axis of the fiber reinforcements extends parallel, perpendicularly or obliquely to a longitudinal axis of the air spring.

10. The air spring as claimed in claim 1, wherein the first and the second clamping region are reinforced radially by ribs.

11. The air spring as claimed in claim 3, wherein the second air path is situated between the first air volume and the external environment, within one rib of the ribs.

12. The air spring as claimed in claim 1, wherein shapes of at least one of the air spring cover, the rolling piston and of the air spring bellows can be matched to an installation region in a vehicle.

13. The air spring as claimed in claim 1, wherein the air spring bellows is formed into a fold between the first clamping ring and the second clamping ring.

14. A motor vehicle running gear having at least one air spring, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

15. A motor vehicle having a body and running gear having at least one air spring, comprising an air spring cover and a rolling piston, wherein the air spring cover and the rolling piston are connected by an air spring bellows, wherein the air spring cover has a first, body-side clamping region and a second, piston-side clamping region for the air spring bellows, wherein the first and the second clamping region are designed to receive a first clamping ring and a second clamping ring for clamping the air spring bellows, wherein the first clamping ring and the second clamping ring are designed to fix the air spring bellows on the air spring cover, wherein the rolling piston and the air spring bellows have a common first air volume in the inner space thereof, wherein the end of the rolling piston closest to the running gear has a third clamping region, wherein the third clamping region is designed to receive a third clamping ring, wherein the third clamping ring is designed to seal off the first air volume from the external environment, wherein the air spring cover has a second air volume, wherein the air spring bellows forms an outer wall of the first air volume and of the second air volume, with the result that the first air volume and the second air volume are sealed off from an external environment, wherein the second clamping ring is arranged in such a way that the first air volume is spatially separated from the second air volume, wherein the air spring cover is designed to accommodate a switching valve, which is designed to allow a first air path between the first air volume and the second air volume in one operating state, thus enabling the second air volume to be linked to the first air volume.

* * * * *